US012762533B2

(12) United States Patent
Stoddart

(10) Patent No.: US 12,762,533 B2
(45) **Date of Patent: *Oct. 13, 2026**

(54) SYSTEMS AND METHODS FOR ELECTRONIC RECEIPT TRANSFER USING ULTRAWIDEBAND RADIO TECHNOLOGY

(71) Applicant: VeriFone, Inc., Wilmington, DE (US)

(72) Inventor: Ian Matthew Stoddart, Leeds (GB)

(73) Assignee: VeriFone, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,462

(22) Filed: Dec. 31, 2024

(65) Prior Publication Data

US 2025/0156836 A1 May 15, 2025

Related U.S. Application Data

(63) Continuation of application No. 17/359,234, filed on Jun. 25, 2021, now Pat. No. 12,217,238.

(51) Int. Cl.
*G06Q 20/32* (2012.01)
*G06Q 20/04* (2012.01)

(52) U.S. Cl.
CPC ....... *G06Q 20/3255* (2013.01); *G06Q 20/047* (2020.05); *G06Q 20/322* (2013.01); *G06Q 20/3278* (2013.01)

(58) Field of Classification Search
CPC .............................................. G06Q 20/00–425
See application file for complete search history.

(56) References Cited

U.S. PATENT DOCUMENTS

| | | | | |
|---|---|---|---|---|
| 7,487,912 B2 * | 2/2009 | Seifert | ..................... | G07G 1/12 235/380 |
| 11,019,567 B2 * | 5/2021 | Foster | ................... | G06F 1/3287 |

(Continued)

FOREIGN PATENT DOCUMENTS

| | | | |
|---|---|---|---|
| CN | 114581068 A * | 6/2022 | ........... G06F 9/4418 |
| KR | 20110050608 A | 5/2011 | |
| KR | 20130013941 A | 2/2013 | |
| WO | 2020214758 A1 | 10/2020 | |

OTHER PUBLICATIONS

Communication Pursuant to Rules 70(2) and 70A(2) EPC, EP Patent Application No. 22829508.5, dated Mar. 18, 2025, 1 page.

(Continued)

*Primary Examiner* — Chenyuh Kuo
(74) *Attorney, Agent, or Firm* — Bond, Schoeneck & King, PLLC

(57) ABSTRACT

A method for electronic receipt transfer via ultra-wideband electronic (UWB) radio technology may include: causing, by a payment terminal computer program, an UWB radio to transmit a range request signal from a first antenna; receiving, by the payment terminal computer program and one or more customer electronic devices, a pair of replies to the range request signal, each comprising a first reply signal received at the first antenna and a second reply signal received at a second antenna; determining, by the payment terminal computer program, a distance between the UWB radio and each customer electronic device based on a time of flight; selecting, by the payment terminal computer program, the customer electronic devices having the distance that is closest to the UWB radio; and communicating, by the payment terminal computer program, an electronic receipt for a transaction to the selected customer electronic device.

18 Claims, 4 Drawing Sheets

(56) References Cited

U.S. PATENT DOCUMENTS

| | | | | |
|---|---|---|---|---|
| 11,405,185 | B2 * | 8/2022 | Sierra | H04L 9/003 |
| 11,448,747 | B2 * | 9/2022 | Patole | G01S 13/08 |
| 11,470,444 | B2 * | 10/2022 | Burowski | H04W 4/026 |
| 11,470,659 | B2 * | 10/2022 | Smets | H04B 5/0031 |
| 2014/0358788 | A1 * | 12/2014 | Cummins | G06Q 20/047 705/44 |
| 2017/0046676 | A1 | 2/2017 | Berry et al. | |
| 2018/0349653 | A1 | 12/2018 | Al-kadi et al. | |
| 2021/0072373 | A1 * | 3/2021 | Schoenberg | G01S 13/765 |
| 2021/0312424 | A1 * | 10/2021 | Lee | G06Q 20/20 |

OTHER PUBLICATIONS

European Search Report, EP Patent Application No. 22829508.5, dated Feb. 26, 2025, pp. 1-11.

Sfeir, Joseph: "What's the Difference Between Bluetooth Low Energy, UWB, and NFC for Keyless Entry? Electronic Design", Aug. 31, 2020 (Aug. 31, 2020), XP093250547, Retrieved from the Internet: URL: https://www.electronicdesign.com/markets/automotive/article/21140598/whats-the-difference-between-bluetooth-low-energy-uwb-and-nfc-for-keyless-entry.

International Search Report and the Written Opinion of the International Searching Authority, International Patent Application No. PCT/US22/73108, dated Sep. 14, 2022, pp. 1-10.

Internationalpreliminary Report on Patentability, International Patent Application No. PCT/US22/73108, dated Dec. 14, 2023, pp. 1-8.

Klavestad et al., Monitoring Activities of Daily Living Using UWB Radar Technology: A Contactless Approach, MDPI, Sep. 2020 (Year: 2020).

Communication Pursuant To Article 94(3) EPC, EP Patent Application No. 22829508.5, dated Jul. 6, 2026, pp. 1-11.

* cited by examiner

SYSTEMS AND METHODS FOR ELECTRONIC RECEIPT TRANSFER USING ULTRAWIDEBAND RADIO TECHNOLOGY

CROSS-REFERENCE TO RELATED APPLICATIONS

The present application is a continuation of U.S. patent application Ser. No. 17/359,234 filed Jun. 25, 2021, and entitled "Systems and Methods for Electronic Receipt Transfer Using Ultrawideband Radio Technology", the entirety of which is incorporated herein by reference.

BACKGROUND OF THE INVENTION

1. Field of the Invention

The present disclosure relates generally to systems and methods for electronic receipt transfer using ultrawideband radio technology.

2. Description of the Related Art

After making a purchase, customers are often given the option of receiving a paper receipt or an electronic receipt. Paper receipts are easy to lose and add clutter, so many customers opt for the convenience of an electronic receipt. Because these receipts are often provided by electronic mail or by text (short messaging service, or SMS) message, the customer must provide personal contact information to the merchant in order to receive the electronic receipt. Not only is this a slow process, as the customer must speak or enter an email address or phone number on a small touchscreen, but it can result in the merchant using this information to send unsolicited messages to the customer. Customers may also have reservations about privacy and may choose to not share their personal information.

SUMMARY OF THE INVENTION

Systems and methods for electronic receipt transfer using ultrawideband radio technology are disclosed. According to one embodiment, a method for electronic receipt transfer via ultra-wideband electronic radio technology may include: (1) causing, by a payment terminal computer program executed by a payment terminal comprising a computer processor, an ultra-wideband (UWB) radio to transmit a range request signal from a first antenna; (2) receiving, by the payment terminal computer program and from each of one or more customer electronic devices comprising customer electronic device UWB radios, a pair of replies to the range request signal, the pair of replies comprising a first reply signal received at the first antenna and a second reply signal received at a second antenna; (3) determining, by the payment terminal computer program, a distance between the UWB radio and each customer electronic device based on a time of flight for the range request signal and the pair of reply signals; (4) selecting, by the payment terminal computer program, one of the one or more customer electronic devices that has the distance that is closest to the UWB radio; and (5) communicating, by the payment terminal computer program and using the UWB radio or a RF radio, an electronic receipt for a transaction at the payment terminal to the selected customer electronic device.

In one embodiment, the method may further include causing, by the payment terminal computer program, a wake-up signal to be transmitted, wherein the wake-up signal causes the customer electronic device UWB radios on the one or more customer electronic devices to be turned on or activated.

In one embodiment, the method may further include determining, by the payment terminal computer program, that the selected customer electronic devices may be within a predetermined distance of the payment terminal.

In one embodiment, the method may further include communicating, by the payment terminal computer program and using the UWB radio, a request for approval for the electronic receipt transfer for an electronic receipt associated with a transaction to the selected customer electronic device; and receiving, by the payment terminal computer program and using the UWB radio, an approval message for the electronic receipt transfer from the selected customer electronic device without customer contact information for customer.

In one embodiment, the approval message may include an identification of a communication channel for receiving the electronic receipt, such as UWB Bluetooth, WiFi, NFC, etc. The approval message may also include an identification of a communication channel for receiving the electronic receipt, such as short messaging service (SMS) and email, and may include an address, such as a SMS address and an email address.

In one embodiment, the method may further include determining, by the payment terminal computer program, a position of each of the one or more customer electronic devices using an angle of arrival for each first reply signal and second reply signal.

In one embodiment, the electronic receipt may be communicated as an image file.

According to another embodiment, a payment terminal device may include a memory comprising a payment terminal computer program and an ultra-wideband (UWB) radio comprising a plurality of antennas. The payment terminal computer program may be configured to: (1) cause the UWB radio to transmit a range request signal from a first antenna; (2) receive from each of one or more customer electronic devices, each customer electronic device comprising a customer electronic device UWB radio, a pair of replies to the range request signal, the pair of replies comprising a first reply signal received at the first antenna and a second reply signal received at a second antenna; (3) determine a distance between the UWB radio and each customer electronic devices based on a time of flight for the range request signal and the pair of reply signals; (4) select a desired one of the one or more customer electronic devices based on the respective time of flight of the pair of replies; and (5) communicate an electronic receipt for a transaction to the selected customer electronic device.

In one embodiment, the payment terminal computer program may be further configured to cause a wake-up signal to be transmitted, wherein the wake-up signal causes the customer electronic device UWB radios on the one or more customer electronic devices to be activated.

In one embodiment, the payment terminal computer program may determine that the selected customer electronic devices may be within a predetermined distance of the payment terminal device.

In one embodiment, the payment terminal computer program may be further configured to: communicate a request for approval for an electronic receipt transfer for an electronic receipt associated with a transaction to the selected customer electronic device using the UWB radio; and receive an approval message for the electronic receipt transfer from the selected customer electronic device without customer contact information for customer using the ultra-wideband radio.

In one embodiment, the payment terminal may also include a Bluetooth, WiFi, or NFC radio, and the approval message may include an identification of a communication channel for receiving the electronic receipt comprising one of UWB, Bluetooth, WiFi, and NFC.

In one embodiment, the approval message may include an identification of a communication channel for receiving the electronic receipt, such as short messaging service (SMS) and email, and may include an address, such as a SMS address and an email address.

In one embodiment, the payment terminal computer program may be further configured to determine a position of each of the one or more customer electronic devices using an angle of arrival for each first reply signal and second reply signal.

In one embodiment, the electronic receipt may be communicated as an image file.

According to another embodiment, an electronic device may include: a memory executing an operating system; a computer processor; and an ultra-wideband (UWB) radio. The electronic device may be configured to: (1) receive, by the UWB radio and from a payment terminal UWB radio, a range request signal; (2) communicate, by the UWB radio, a reply to the range request signal; and (3) receive, from the payment terminal, a communication comprising an electronic receipt for a transaction, wherein the electronic receipt may be received without the electronic device providing contact information for a customer associated with the electronic device. The electronic receipt may be received as an image file.

In one embodiment, the electronic device may be further configured to turn on or activate the UWB radio in response to receiving a wake-up message.

In one embodiment, the electronic device UWB radio receives the electronic receipt from the payment terminal UWB radio.

In one embodiment, the electronic device may also include at least one of a Bluetooth radio, a WiFi radio, and a NFC radio, and the electronic device receives the electronic receipt using one of the UWB radio, the Bluetooth radio, the WiFi radio, and the NFC radio.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for electronic receipt transfer using ultrawideband radio technology.

Ultra-wideband, or UWB, is a radio technology that uses low energy for short-range, high-bandwidth communications (e.g., over 500 MHz) over a large portion of the radio spectrum. The time of flight of a UWB signal—the time it takes a signal to be transmitted, and a reply to that signal to be received from the other UWB radio—may be used to determine a distance between the UWB radios. In contrast, other technologies, such as Bluetooth Low Energy (BLE) and WiFi, generally use Received Signal Strength Indicator, or RSSI, to estimate distances based on the signal strength of a received signal. Because BLE and WiFi are primarily designed to transmit data, they use narrowband signalling with long data packets. This is inherently prone to interference within the packet, which introduces difficulty and errors into determining a time of flight for these signals. Further, any shielding encountered by the Bluetooth or WiFi signal may make devices appear to be further apart than they are, further reducing the accuracy of RSSI.

Using UWB communication, a payment terminal may locate a customer electronic device, such as a smart phone with a UWB radio, with sufficient precision to determine that the customer electronic device is likely associated with a customer conducting a transaction at the payment terminal. Once identified, an electronic receipt may be offered and provided to the customer electronic device without the customer having to provide any personal information, such as an email address or phone number, to the merchant. This not only protects the customer's privacy, but it speeds up the electronic receipt process as neither the merchant nor the customer is required to enter customer contact information for the electronic receipt to be sent.

The disclosure of IEEE 802.15.4, which sets forth the IEEE standard for UWB communications, is incorporated, by reference, in its entirety.

Figure 1:
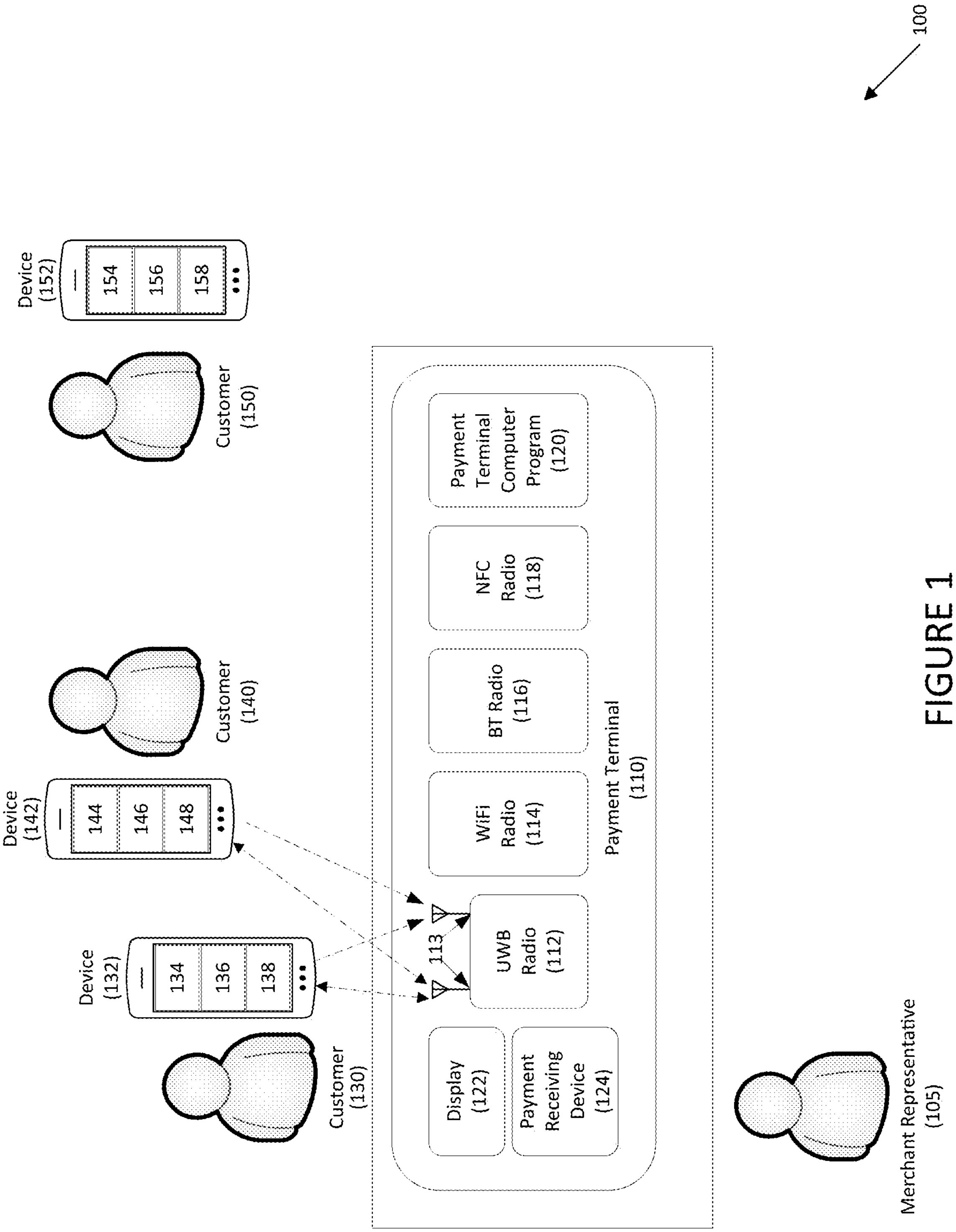
FIG. 1 depicts a system for electronic receipt transfer using ultrawideband radio technology according to one embodiment.

Referring to FIG. 1, a system for electronic receipt transfer using UWB according to one embodiment is disclosed. System 100 may include a merchant system, including, for example, payment terminal 110. Payment terminal 110 may be operated by merchant representative 105, who may be an employee of the merchant.

Payment terminal 110 may be any suitable point of transaction device with which any of customers 130, 140, 150 may conduct a transaction. Payment terminal 110 may include display 122 and payment receiving device 124. Display 122 may be any suitable display that may display instructions to a customer. Payment receiving device 124 may be any suitable device that may receive payment, such as a credit card payment, NFC payment, cash payment, etc., from the customers. In one embodiment, display 122 and payment receiving device 124 may be part of the same device. During a transaction, a customer will likely be located in proximity to display 122 and/or payment receiving device 124.

Payment terminal computer program 120 may be a computer program or application that is executed by a computer processor (not shown) in payment terminal 110. For example, payment terminal computer program 120 may control the operation of UWB radio 112, WiFi radio 114, Bluetooth (BT) radio 116, and Near Field Communication (NFC) radio 118. Payment terminal computer program 120 may further control display 122 to display instructions, and payment receiving device 124 to receive payment for a transaction. Payment terminal computer program 120 may further control other operations of payment terminal 110 as is necessary and/or desired.

Customer electronic devices 132, 142, and 152 may each be associated with customers 130, 140 and 150, respectively.

Customer electronic devices 132, 142, 152 may be any suitable electronic device, including smartphones, smart watches, Internet of Things (IoT) appliances, etc. Customer electronic devices 132, 142, 152 may execute one or more mobile application 134, 144, 154, such as a merchant application, and a customer electronic device computer program 138, 148, 158, such as an operating system. Customer electronic devices 132, 142, and 152 may each include UWB radios 136, 146, 156, respectively. Customer electronic devices 132, 142, 152 may receive and store the electronic receipt received from payment terminal 110 in local memory, in the cloud, etc.

Payment terminal 110 may include UWB radio 112 that may include a plurality of antennas 113. One antenna 113 may be used to transmit UWB signals to one or more UWB radios 136, 146, 156 on customer electronic devices 132, 142, and 152, respectively, and both antennas 113 may receive signals from one or more UWB radios 136, 146, 156 on customer electronic devices 132, 142, and 152, respectively. FIG. 1 depicts two antennas 113; additional antennas 113 may be used as is necessary and/or desired.

A minimum of two antennas 113 may be required to determine the angle of arrival, as the angle of arrival is calculated from either the time or phase difference between the same signal received at each of the antennas 113. With two antennas 113, however, there may be uncertainty with regard to which side of antennas 113 any of customer devices 132, 142, 152 are located, and the positioning of antennas 113 and payment terminal 110 may be used to assist in determining the side (e.g., antennas 113 may be positioned so that it is physically impossible for a customer electronic device to be on one side of the antennas 113). With three antennas 113, the positioning of any of customer devices 132, 142, 152 is absolute with no uncertainty as to which side of the antennas 113 the customer electronic device is located.

Using UWB radio 112, payment terminal computer program 120 may identify a distance between antennas 113 and one or more of UWB radios 136, 146, 156 on customer electronic devices 132, 142, and 152, respectively. In one embodiment, payment terminal computer program 120 may cause UWB radio 112 to transmit a range request signal (e.g., a signal containing a range request packet) from at least one of antennas 113, and both antennas 113 may receive a reply signal from one or more UWB radios 136, 146, 156. Payment terminal computer program 120 may then use the times of flight for the range request signal and each reply signal for each antenna 113 to determine the distance between one or more of customer electronic devices 132, 142, and 152 and UWB radio 112.

In one embodiment, payment terminal computer program 120 may also use the angles of arrival of each reply signal to determine which side of UWB radio 112 (e.g., the customer side or the merchant side) each customer electronic device 132, 142, and 152 is located. Examples of protocols for using UWB ranging are disclosed in E. Karapistoli et al. "An overview of the IEEE 802.15.4a Standard," in IEEE Communications Magazine, vol. 48, no. 1, pp. 47-53 (January 2010), the disclosure of which is hereby incorporated, by reference, in its entirety.

In one embodiment, payment terminal computer program 120 may compare the determined locations for the one or more of customer electronic devices 132, 142, and 152 to a predetermined distance from UWB radio 112, for example within 12 inches from UWB radio 112. The predetermined distance may be set as is necessary and/or desired based on the configuration of the customer area, payment terminal 110, etc. In another embodiment, payment terminal computer program 120 may compare the determined locations to an expected customer position in front of payment terminal 110, such as within 12 inches of payment receiving device 124 or display 122. Based on the comparison, payment terminal computer program 120 may determine the customer electronic device, such as customer electronic device 132, that is likely to be conducting the transaction. In another embodiment, payment terminal computer program 120 may select the customer electronic device that is closest to payment terminal 110, such as customer electronic device 132.

In one embodiment, in order to be identified by UWB radio 112, customer electronic devices 132, 142, 152 may be required to have their respective UWB radios 136, 146, 156 turned on, listening, or otherwise configured to communicate by UWB. In one embodiment, BT radio 116 or a separate radio (not shown) may communicate a signal (e.g., a RF signal) that may result in UWB radios 136, 146, 156 on customer electronic devices 132, 142, 152 turning on or otherwise becoming active. For example, BT radio 116 may emit a BLE signal, such as a beacon frame, that may be received by a radio (e.g., a Bluetooth radio) on device 132, 142, 152 (not shown) that may cause the operating system on customer electronic devices 132, 142, 152 to turn on or otherwise activate its UWB radios 136, 146, 156. In one embodiment, payment terminal computer program 120 may control BT radio 116 to be active during a transaction with a customer, and inactive otherwise. In another embodiment, UWB radio 112 may send the beacon frame that may also result in UWB radios 136, 146, 156 on customer electronic devices 132, 142, 152 to turn on or otherwise become active.

In one embodiment, at any point in the transaction, such as after payment, payment terminal computer program 120 may cause display 122 to display an instruction, such as "Hold your electronic device in front of the card reader to receive your electronic receipt." By using this message, the likelihood that the customer electronic device is the correct customer electronic device is increased.

Payment terminal computer program 120 may further control UWB radio 112 to communicate an electronic receipt to the determined customer electronic device. In one embodiment, payment terminal computer program 120 may communicate the electronic receipt in an image format, such as .jpg, .bmp, etc. In another embodiment, payment terminal computer program 120 may communicate the electronic receipt as a data stream or other format that may be acceptable to mobile application 134, 144, 154 executed by customer electronic devices 132, 142, 152, respectively. In another embodiment, should the customer prefer to receive the electronic receipt using other than UWB communication, payment terminal computer program 120 may communicate the electronic receipt to the customer electronic device using WiFi radio 114, BT radio 116, and/or NFC radio 118.

Payment terminal 110 may receive a payment for the transaction from customer 130 using payment receiving device 124. The payment may be made may credit/debit card, cash, from an electronic wallet or payment application on customer 130's customer electronic device 132, etc.

Figure 2A:
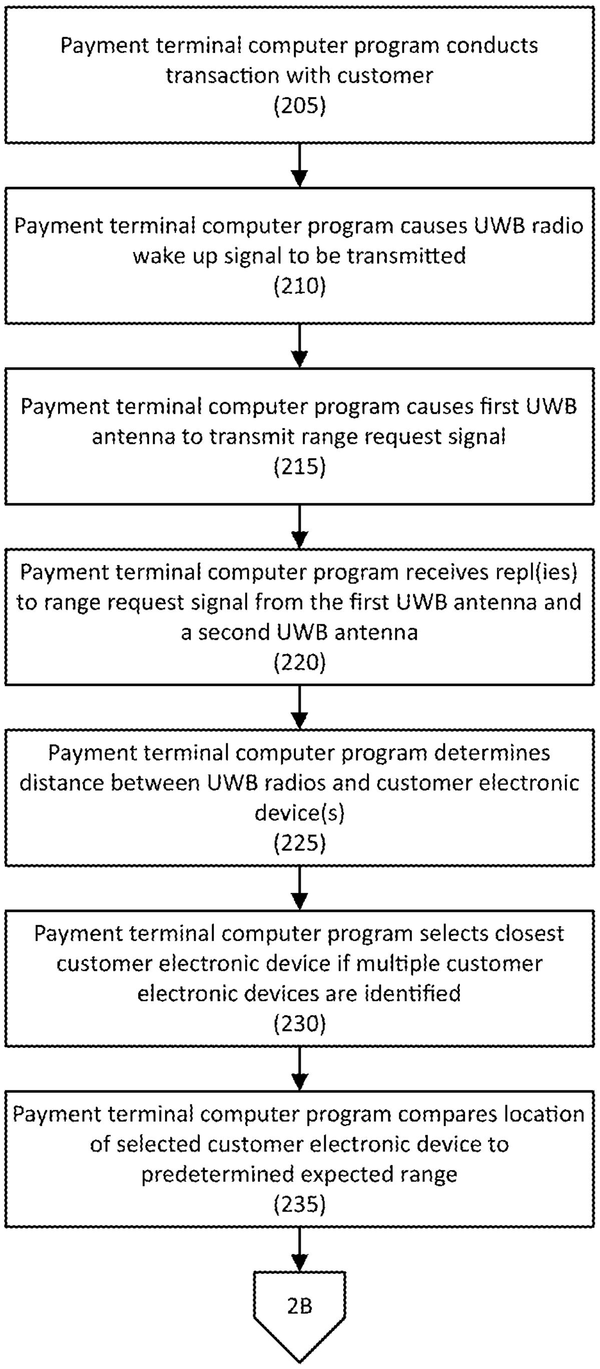
FIGS. 2A and 2B depict a method for electronic receipt transfer using ultrawideband radio technology according to one embodiment.
Figure 2B:
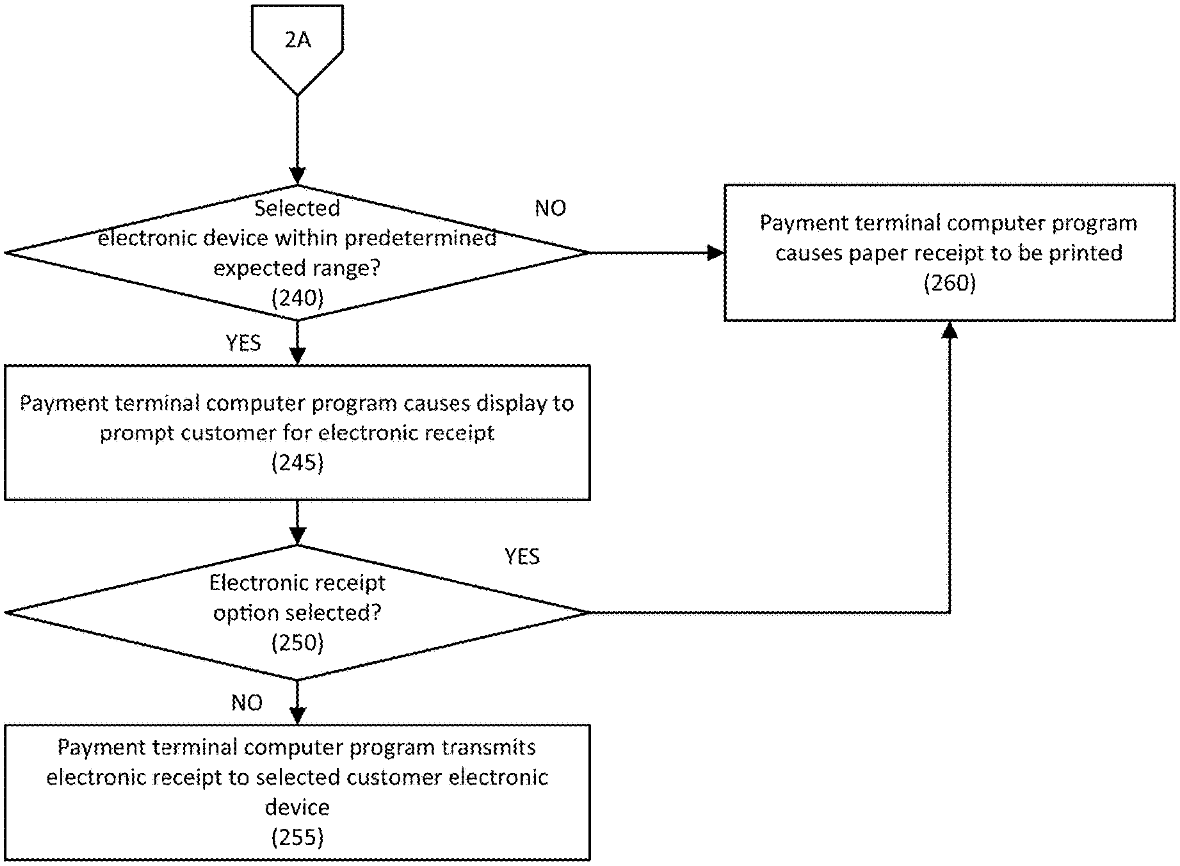

Referring to FIGS. 2A and 2B, a method for electronic receipt transfer using UWB according to one embodiment is disclosed.

In step 205, a payment terminal computer program 120 executed by a payment terminal may conduct a transaction with a customer. In one embodiment, the payment terminal computer program 120 may receive payment for the transaction at, for example, a payment device. The payment may be received as, for example, credit card payment, NFC payment, cash payment, etc.

In step 210, the payment terminal computer program 120 may optionally cause a UWB radio "wake up" signal to be transmitted. For example, at any suitable point in the transaction, the payment terminal computer program 120 may cause transmission of a RF signal that causes customer electronic devices with UWB radios receiving the signal to turn on or otherwise become active. The payment terminal computer program 120 may communicate the wake-up signal, such as a beacon frame or any other suitable signal as is necessary and/or desired.

In another embodiment, the wake-up signal may not be transmitted. Instead, the payment terminal computer program 120 may instruct the customer to activate or turn on the UWB radio on the customer electronic device.

In step 215, the payment terminal computer program 120 may control the UWB radio to identify UWB-enabled customer electronic devices. In one embodiment, the payment terminal computer program 120 may control the UWB radio to transmit a range request signal from a first UWB antenna. In another embodiment, a plurality of antennas may transmit UWB signals.

In step 220, the payment terminal computer program 120 may receive a pair of replies to the range request signal-a first reply at the first UWB antenna and a second reply at a second UWB antenna. In one embodiment, the replies may be from UWB radios on one or more customer electronic device.

In step 225, the payment terminal computer program 120 may calculate a distance from the antenna(s) and the UWB radio that provided the reply signal(s) based on the time of flight of the range request signal and the reply signal(s). In one embodiment, the time of flight calculation may be either based on the reply signal received from one antenna or a calculation based on the reply signal received at both antennas.

In one embodiment, the payment terminal computer program 120 may further use the angle of arrival for the replies to determine a position, such as the side of the UWB radio (e.g., customer side or merchant side), for the customer electronic devices. For example, the angle of arrival may use one or both of time difference between the reply signals received at each antenna, and a phase difference between the signal received at each antenna.

In embodiments, the payment terminal computer program 120 may transmit multiple range request signals, and may receive multiple replies, and may determine multiple distances. The payment terminal computer program 120 may average the distances as desired.

In step 230, if more than one customer electronic device is identified, the payment terminal computer program 120 may select the customer electronic device that is closest to the UWB radio or an expected customer area, such as in front of the payment device or display, depending on the position of the UWB radio.

In step 235, the payment terminal computer program 120 may optionally compare the location of the selected customer electronic device to a predetermined expected range from the UWB radio, such as 12 inches. The predetermined expected range may be set as is necessary and/or desired in order to account for the configuration of the payment terminal, distance between a display or payment device and the UWB radio, etc. In another embodiment, the payment terminal computer program 120 may select the customer electronic device that is closest to the payment terminal.

In step 240, if the selected customer electronic device is not within the predetermined expected range, in step 260, the payment terminal computer program 120 may cause a receipt to be printed.

In step 245, the payment terminal computer program 120 may optionally cause the display to display an option to the merchant representative to provide an electronic receipt to the customer's electronic device. In another embodiment, the payment terminal computer program 120 may communicate, using the UWB radio, a message to the selected customer electronic device asking if the customer would like to receive an electronic receipt.

If, in step 250, the payment terminal computer program 120 may receive approval for the electronic receipt, either from merchant representative or in an approval message from the selected customer electronic device via the UWB radio. In one embodiment, the approval message may include an identification of a communication channel for receiving the electronic receipt, such as UWB, NFC, WiFi, Bluetooth, SMS, email, etc. The approval message may further include an SMS or email address as necessary. In step 255, the payment terminal computer program 120 may communicate the electronic receipt to the selected customer electronic device using the UWB radio or the selected communication channel.

If, in step 250, the payment terminal computer program 120 receives a rejection for the electronic receipt, either from merchant representative or in a rejection message from the selected customer electronic device via the UWB radio, in step 260, the payment terminal computer program 120 may cause a paper receipt to be printed.

Figure 3:
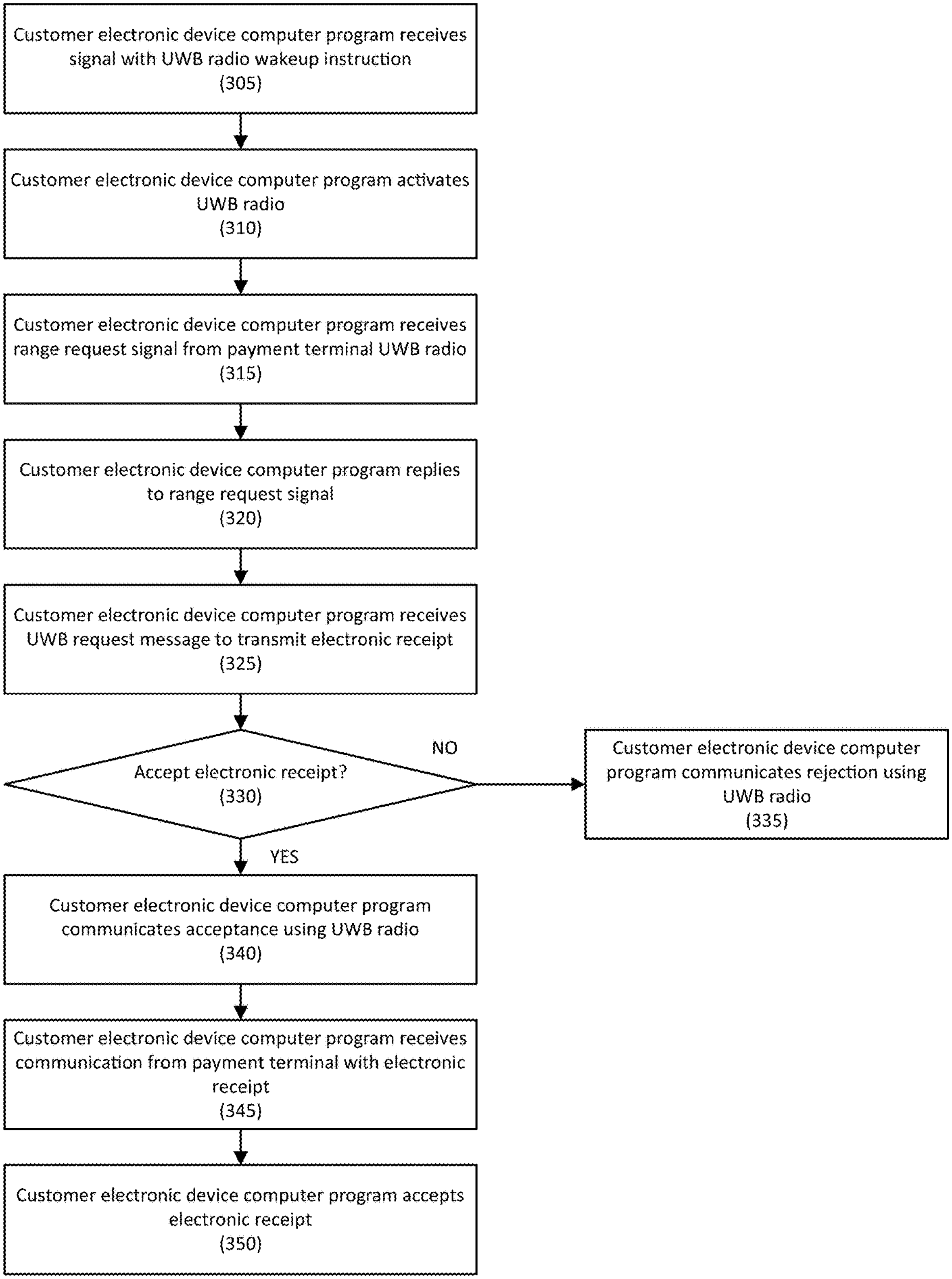
FIG. 3 depicts a method for electronic receipt transfer using ultrawideband radio technology according to another embodiment.

Referring to FIG. 3, a method for electronic receipt transfer using UWB according to another embodiment is disclosed. In step 305, a customer electronic device computer program 138, such as an operating system, may optionally receive a signal with a UWB radio wake up instruction. In one embodiment, the signal may be a BLE signal, a beacon frame, etc.

In step 310, if so equipped, the customer electronic device may turn on or otherwise activate the UWB radio. In one embodiment, the UWB radio may be turned on or otherwise activated in response to the wake-up signal, the UWB radio may be manually turned on or activated, etc.

In step 315, the customer electronic device computer program 138 may receive a UWB signal, such as a range request signal, from a UWB radio transmitter associated with a payment terminal, and, in step 320, the customer electronic device computer program 138 may cause the UWB radio on the customer electronic device to reply to the UWB signal.

In step 325, the customer electronic device computer program 138 may optionally receive a UWB request message from the payment terminal requesting approval for transmission of an electronic receipt. In one embodiment, the message may be displayed on the screen of the customer electronic device.

In one embodiment, the customer electronic device computer program 138 may also be presented with an option to receive the electronic receipt over a communication channel other than UWB. For example, the UWB request message may include different options for receiving the electronic receipt, including UWB, NFC, WiFi, Bluetooth, SMS, and email. In one embodiment, if SMS or email are selected, the customer electronic device computer program 138 may provide the SMS or email address for the customer, which may be received manually from the customer, retrieved from memory, etc.

In step 330, the customer electronic device computer program 138 may receive approval or rejection of the electronic receipt from the customer. If the customer rejects the electronic receipt, in step 335, the customer electronic device computer program 138 may communicate the rejection to the payment terminal using the UWB radio. If the customer accepts the electronic receipt, in step 340, the customer electronic device computer program 138 may communicate the acceptance to the payment terminal using the UWB radio.

In one embodiment, the approval message may further include an identification of the communication channel on which to receive the electronic receipt.

In step 345, the customer electronic device computer program 138 may receive a communication including the electronic receipt from the payment terminal. The communication may be received by the UWB radio, unless the approval message indicated a different communication channel. In another embodiment, the customer electronic device computer program 138 may receive the communication including the electronic receipt without an acceptance message from the customer.

In step 350, depending on the communication channel, the customer electronic device computer program 138 may be required to accept the electronic receipt in, for example, an on-screen notification, before it is loaded onto the customer electronic device. In one embodiment, the electronic receipt may be received in an image format, such as .jpg, .bmp, etc. In another embodiment, the electronic receipt may be received in data stream or other format that may be acceptable to a mobile application that may be executed by the customer electronic device, such as an electronic wallet application, a merchant application, etc.

Thus, in embodiments, the customer does not need to provide any personal identification to the merchant in order to receive the electronic receipt. The customer does not need to speak contact information (e.g., SMS or email address) to the merchant representative to receive the electronic receipt; instead, the electronic receipt may be communicated directly to the customer's electronic device upon identification and/or approval.

It will be appreciated by persons skilled in the art that the present invention is not limited by what has been particularly shown and described hereinabove. Rather, the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for electronic receipt transfer via ultra-wideband electronic radio technology, comprising:

causing, by a payment terminal computer program executed by a payment terminal comprising a computer processor, a wake-up signal to be transmitted, wherein the wake-up signal causes customer electronic device UWB radios on one or more customer electronic devices to be turned on or activated;

causing, by the payment terminal computer program, an ultra-wideband (UWB) radio to transmit a range request signal from a first antenna;

receiving, by the payment terminal computer program and from each of one or more customer electronic devices comprising the customer electronic device UWB radios, a pair of replies to the range request signal, the pair of replies comprising a first reply signal received at the first antenna and a second reply signal received at a second antenna;

determining, by the payment terminal computer program, a distance between the UWB radio and each customer electronic device based on a time of flight for the range request signal and the pair of reply signals;

selecting, by the payment terminal computer program, one of the one or more customer electronic devices that is within a predetermined distance;

communicating, by the payment terminal computer program and using the UWB radio, a request for approval for an electronic receipt transfer to the selected customer electronic device;

receiving, by the payment terminal computer program and using the UWB radio, an approval message for the electronic receipt transfer from the selected customer electronic device without customer contact information for customer; and communicating, by the payment terminal computer program and using the UWB radio or a RF radio, an electronic receipt for a transaction at the payment terminal to the selected customer electronic device.

2. The method of claim 1, wherein the approval message comprises an identification of a communication channel for receiving the electronic receipt comprising one of UWB Bluetooth, WiFi, NFC.

3. The method of claim 1, wherein the approval message comprises an identification of a communication channel for receiving the electronic receipt comprising one of short messaging service (SMS) and email, and an address comprising one of a SMS address and an email address.

4. The method of claim 1, further comprising:

determining, by the payment terminal computer program, a position of each of the one or more customer electronic devices using an angle of arrival for each first reply signal and second reply signal.

5. The method of claim 1, wherein the electronic receipt is communicated as an image file.

6. The method of claim 1, wherein the wake-up signal is transmitted from a second radio.

7. The method of claim 1, wherein the wake-up signal is transmitted from the UWB radio.

8. A payment terminal device, comprising:

a memory comprising a payment terminal computer program;

an ultra-wideband (UWB) radio comprising a plurality of antennas;

a processor configured to execute the payment terminal computer program;

wherein the payment terminal computer program is configured to:

cause a wake-up signal to be transmitted, wherein the wake-up signal causes customer electronic device UWB radios on one or more customer electronic devices to be activated;

cause the UWB radio to transmit a range request signal from a first antenna;

receive from each of one or more customer electronic devices, each customer electronic device comprising a customer electronic device UWB radio, a pair of replies to the range request signal, the pair of replies comprising a first reply signal received at the first antenna and a second reply signal received at a second antenna;

determine a distance between the UWB radio and each customer electronic devices based on a time of flight for the range request signal and the pair of reply signals;

select one of the one or more customer electronic devices that is within a predetermined distance;

communicate a request for approval for an electronic receipt transfer to the selected customer electronic device using the UWB radio;

receive an approval message for the electronic receipt transfer from the selected customer electronic device without customer contact information for customer using the UWB radio; and communicate an electronic receipt for a transaction to the selected customer electronic device.

9. The payment terminal device of claim 8, further comprising a Bluetooth, WiFi, or NFC radio, and the approval message comprises an identification of a communication channel for receiving the electronic receipt comprising one of UWB, Bluetooth, WiFi, and NFC.

10. The payment terminal device of claim 8, wherein the approval message comprises an identification of a communication channel for receiving the electronic receipt comprising one of short messaging service (SMS) and email, and an address comprising one of a SMS address and an email address.

11. The payment terminal device of claim 8, wherein the payment terminal computer program is further configured to determine a position of each of the one or more customer electronic devices using an angle of arrival for each first reply signal and second reply signal.

12. The payment terminal device of claim 8, wherein the electronic receipt is communicated as an image file.

13. The payment terminal device of claim 8, wherein the wake-up signal is transmitted from a second radio.

14. The payment terminal device of claim 8, wherein the wake-up signal is transmitted from the UWB radio.

15. A payment terminal device, comprising:

a memory comprising a payment terminal computer program;

an ultra-wideband (UWB) radio comprising a plurality of antennas;

a second radio;

a processor configured to execute the payment terminal computer program;

wherein the payment terminal computer program is configured to:

cause a wake-up signal to be transmitted using the second radio, wherein the wake-up signal causes customer electronic device UWB radios on one or more customer electronic devices to be activated;

cause the UWB radio to transmit a range request signal from a first antenna;

receive from each of one or more customer electronic devices, each customer electronic device comprising a customer electronic device UWB radio, a pair of replies to the range request signal, the pair of replies comprising a first reply signal received at the first antenna and a second reply signal received at a second antenna;

determine a distance between the UWB radio and each customer electronic devices based on a time of flight for the range request signal and the pair of reply signals;

select one of the one or more customer electronic devices based on the respective time of flight of the pair of replies;

communicate a request for approval for an electronic receipt transfer to the selected customer electronic device using the UWB radio;

receive an approval message for the electronic receipt transfer from the selected customer electronic device without customer contact information for customer using the UWB radio; and communicate an electronic receipt for a transaction to the selected customer electronic device.

16. The payment terminal device of claim 15, wherein the approval message comprises an identification of a communication channel for receiving the electronic receipt comprising one of short messaging service (SMS) and email, and an address comprising one of a SMS address and an email address.

17. The payment terminal device of claim 15, wherein the payment terminal computer program is further configured to determine a position of each of the one or more customer electronic devices using an angle of arrival for each first reply signal and second reply signal.

18. The payment terminal device of claim 15, wherein the electronic receipt is communicated as an image file.

* * * * *